Dec. 31, 1940. J. F. RIDER ET AL 2,227,381
ELECTRICAL TESTING SYSTEM
Filed May 5, 1938 2 Sheets-Sheet 1
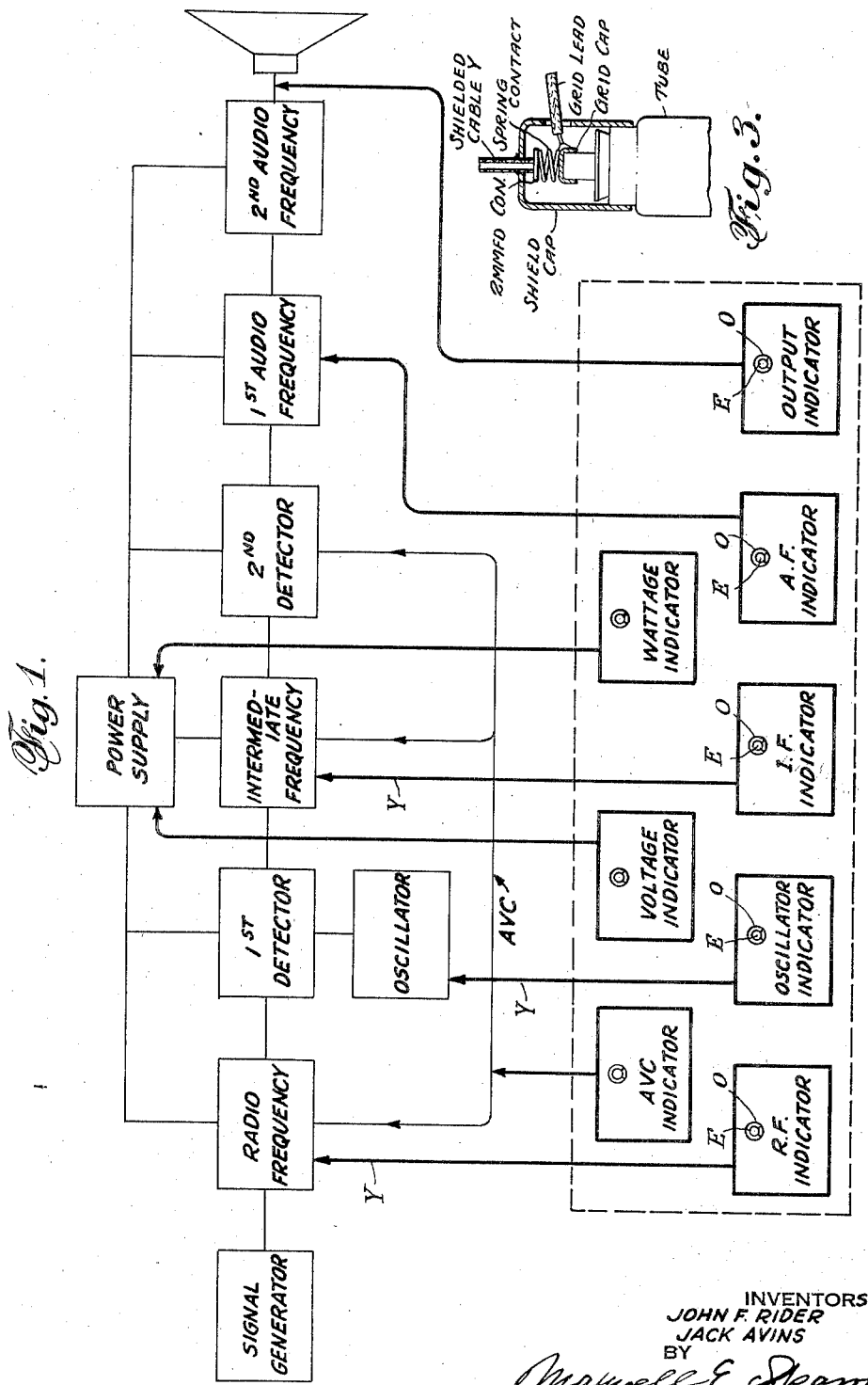
INVENTORS
JOHN F. RIDER
JACK AVINS
BY
Maxwell E. Sparrow
ATTORNEY Dec. 31, 1940.                J. F. RIDER ET AL                2,227,381
                          ELECTRICAL TESTING SYSTEM
                            Filed May 5, 1938            2 Sheets-Sheet 2
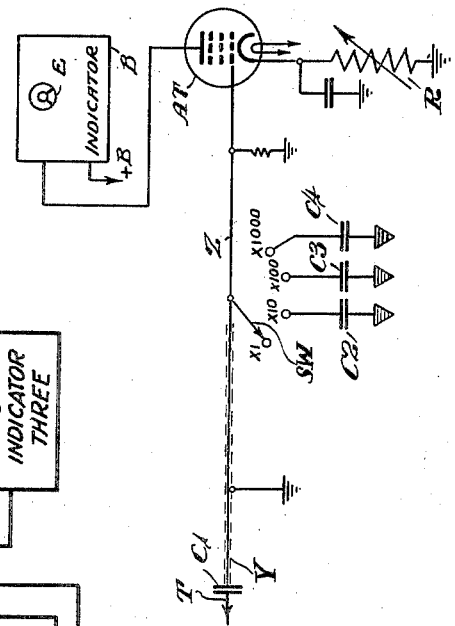
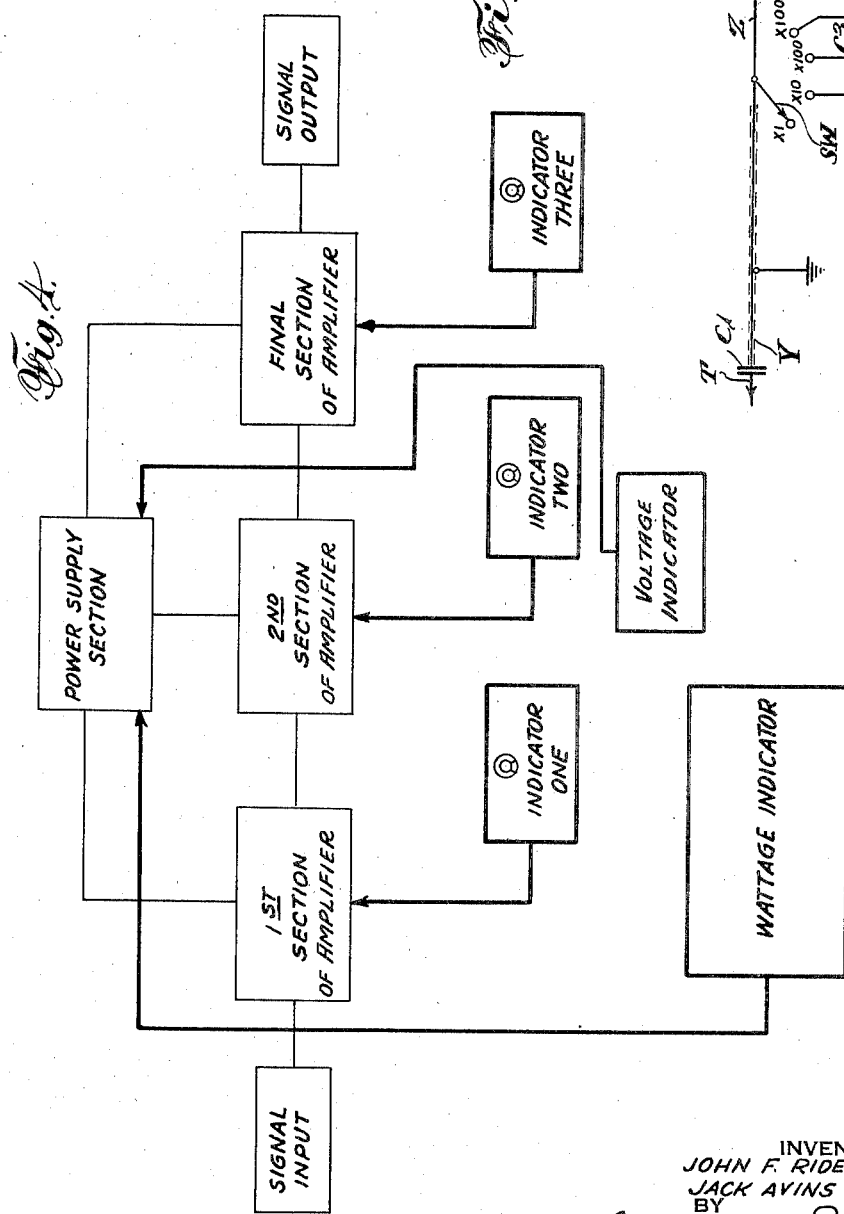
INVENTORS
JOHN F. RIDER
JACK AVINS
BY
   Maxwell E. Sparrow
                ATTORNEY Patented Dec. 31, 1940

2,227,381

UNITED STATES PATENT OFFICE 2,227,381

ELECTRICAL TESTING SYSTEM

John F. Rider and Jack Avins, New York, N. Y.

Application May 5, 1938, Serial No. 206,213

18 Claims. (Cl. 250—27)

This invention relates to a system for localizing faults in radio receivers, electronic amplifiers, and similar equipment. Basically the system functions by indicating the character of the signal such as, its presence, absence, magnitude, quality, etc., and voltages at various key points in the equipment under test. As will become clear from the description, the invention may be employed for the isolation or localization of faults which are intermittent in character and thus is an important contribution to existing techniques and instruments for testing and servicing.

The features and advantages of the invention are explained in the following detailed specification. The accompanying drawings, upon which the specification is based, illustrate in diagrammatic manner preferred systematic applications of the invention and novel features thereof.

In the drawings:

Fig. 1 is a diagrammatic illustration of a system as herein contemplated as applied to a typical superheterodyne radio receiver.

Fig. 2 in a similar manner shows an attenuator employable in the invention.

Fig. 3 illustrates a coupling arrangement employable in the invention.

Fig. 4 is a diagrammatic illustration of a system embodying the invention as applied to an electronic amplifier.

The manner in which the system functions will now be explained in more detail by applying it to the testing of a typical superheterodyne receiver which contains the following stages: radio frequency, first detector, oscillator, intermediate frequency, second detector, first audio, power output, and power supply. The system, however, is not limited in application to the particular type of receiver just described but is equally applicable to other types of receivers, to amplifiers and similar equipment.

Referring to Fig. 1, the receiver under test is connected to a source of power, a signal generator is connected to the input of the receiver, and the controls set to receive the signal as is the case when the receiver is adjusted for normal operation. If the receiver is operating normally and is not defective in any way, the power supply will supply the proper voltages to the various stages of the receiver, the voltage across the output of the power supply will be normal, the AVC (automatic volume control) circuit will supply the proper control voltages to the controlled tubes, and the signal levels will be normal throughout the receiver.

The invention being disclosed contemplates the connection of a system of indicators of various types to various points in different sections of the receiver, as shown in Fig. 1 in heavy lines. Thus the "Radio-frequency (R-F) indicator" which is connected so as to show the character of the signal at any point in the radio-frequency section of the receiver, provides a continuous check on the signal in any part of the radio-frequency section of the receiver; the "Oscillator indicator" provides a continuous check on the frequency and magnitude of the voltage generated by the oscillator section of the receiver; the "Intermediate-frequency (I-F) indicator" is similarly connected to some suitable point in the intermediate-frequency section of the receiver and thus indicates the character of the signal at this point in the receiver circuit; the "AVC indicator" is connected to some point along the AVC feed line and indicates the control voltage hich exists at the point of connection; the "Audio-frequency (A-F) indicator" is similarly connected to a point in the audio-frequency section of the receiver and indicates the character of the signal at this point; the "Output indicator" is connected across the output of the receiver and indicates the character of the signal at the output of the receiver. Indicators of the types enumerated above are described in detail in our copending application entitled "Electrical testing methods and apparatus," Serial No. 256,438, filed February 15, 1939.

The manner in which the system functions to disclose faults will be apparent from a consideration of what happens when the receiver is defective. It follows under these circumstances, that the character of the signal in the output of the device will deviate from that which obtains under normal conditions. Thus, if the receiver is operating abnormally, the "Output indicator" will show this. Furthermore, since the character of the signal is normal at the input terminals of the receiver, it follows that the signal takes on this abnormal character at some point between the input and output terminals of the receiver. The approximate point at which this takes place can be determined from an examination of the several indicators which have been mentioned above. For example, if the operation of the R-F channel is normal, then the "R-F indicator", which may be connected to the output of the R-F amplifier of the receiver will indicate a normal signal at this point. On the other hand, if there is some defect in the R-F amplifier, then the "R-F indicator" will show a change from the normal signal. The further use of the "R-F indicator" as a probe in the R-F section of the receiver makes it possible to establish the point at which the signal departs from the normal state and thus makes it possible to isolate the defect which is causing the abnormal condition.

Similar consideration holds true for all of the other stages of the receiver and for the other indicators which are associated with these stages. In general, then, if any one indicator shows an abnormal signal and the preceding indicator shows a normal signal, it follows that the point at which the signal takes on this abnormal character can be isolated by probing between the two points referred to above.

In addition to the indicators which provide a check on the character of the signal as it passes through the receiver, three other indicators are of value in the system of testing being disclosed. One of these, the "AVC indicator", provides a check on the value of the AVC voltage; by shifting the point of connection, the value of the AVC voltage in any part of the receiver can be determined. Another, the "Voltage indicator," provides a check on the value of the voltage produced by the power supply and other key voltages, such as plate, screen, control grid, cathode, and also automatic frequency control voltages. And a third, the "Wattage indicator," shows the power consumption of the receiver. All these indicators, either singly or in combination, are useful in isolating or localizing the cause of defective operation.

In a preferred embodiment of this system, the R-F and I-F indicators are combined for the sake of simplicity, ease of operation, and low cost. The method of operation is essentially the same as that described above; the composite R-F and I-F indicator then makes it possible to check on the character of the signal at any point in the R-F or I-F section of the receiver.

It is preferable to arrange the testing instrument so that all the indicators and associated controls are mounted on one panel.

In Fig. 1 all the units which are shown in heavy lines may be part of this compact testing unit which is connected to the receiver so as to monitor its operation. The symbol E on this figure designates an electron-ray tube, the screen or target of which is visible through an opening O in the panel. The construction and operation of such a visual indicator is described in detail in U. S. Patent No. 2,122,267, issued June 28, 1938, to H. M. Wagner. Although the electron-ray indicator offers the advantage of providing a low cost indicator, a meter or other type of indicator can of course be used.

A simple and novel method of coupling the indicators to the R-F and I-F sections of the receiver may be employed. To reduce the detuning of the receiver to a minimum and to minimize instability and reaction on the receiver, the indicator is coupled to the receiver through a shielded cable which terminates in a high impedance, such as, for example, the small capacitance C1 which is of the order of 2 mmf. This arrangement is shown at the left of Fig. 2.

A novel capacitive step-by-step attenuator may be used in the R-F and I-F indicators which makes it possible to provide a calibration of the sensitivity of these channels. This is shown schematically in Fig. 2, in which inner conductor Z of the shielded cable Y is connected to the movable arm of a multi-contact switch SW, the various contacts of which are connected, respectively, through a series of capacitors C2, C3, and C4 to ground. The conductor Z is also connected to the input electrode of an electronic amplifier tube AT, the output of which operates the eye E in the indicator B, which is described in detail in the above identified copending application. The capacitance C1 which is connected at the end of the cable Y between the test probe T and conductor Z, in conjunction with each of the capacitors C2, C3 and C4, provides a range of attenuation extending over 1000 to 1. A continuous range of attenuation may be provided by varying the mutual conductance of the amplifier tubes in the indicator over a 10 to 1 range by means of a variable resistor R which varies the amplifier grid bias, for example. In all, a range of attenuation of 10,000 to 1 is provided. It will be noted that the calibration of the attenuator is independent of frequency.

A coupling arrangement shown in Fig. 3 may be used to provide effective shielding of the conductor Y at the point where it connects to the grid of the electron tube and thus minimizes the possibility of interference with the normal operation of the radio device under test. It comprises a shielded cable Y passing through an opening in a metal shield cap and connects to the grid of the electron tube through a small condenser and a spring plunger.

In Fig. 1, the AVC indicator and the voltage indicator are shown as separate indicating units. However, it is possible to combine the functions of the AVC indicator and the voltage indicator in a single unit which can be used to selectively perform either of these functions. This single indicator also may be employed to indicate automatic frequency control, automatic volume control, and other voltages.

Fig. 4 is typical of an electronic amplifier, and is depicted as an audio amplifier for purposes of illustration. The invention, however, is not limited in its application to audio amplifiers but is equally applicable to all electronic amplifiers.

In Fig. 4, the electronic amplifier is shown as consisting of a plurality of sections, each of which may contain one or more electronic tubes which may derive their power from one or more power supply units, generally indicated in Fig. 4 by the legend "Power supply section." Indicators 1, 2 and 3 may be used selectively and or simultaneously for indicating the character of the signal in the various sections of the device. Other indicators may be employed, such as for example, a voltage indicator to selectively indicate the power supply voltages and other key voltages; and a wattage indicator to indicate the power consumption of the amplifier.

Wherever the expression "character of the signal" is used in the specification and claims, this expression is understood to include the presence or absence of the signal or any one or more identifying characteristics of the signal in the circuit or section or sections thereof.

From the foregoing it may be seen that a new and efficient system and device for simultaneously and selectively indicating, detecting and localizing faults in electronic apparatus has been provided. It should be understood, however, that the present disclosure is intended as exemplary only and that others may practice the invention in other ways without departing from the spirit and scope of the invention as claimed herein.

What we claim as new and desire to secure by Letters Patent, is:

1. An instrument for testing the actual voltage conditions at any point in a radio system while a signal is passing therethrough which includes, a visual indicator, a test probe, isolating means connecting said probe to said indicator and including a series capacitor and an adjustable network connected between said capacitor and the input of said indicator, said capacitor forming with said network a calibrated attenuator which is substantially independent of frequency.

2. An instrument for testing the actual voltage conditions at a point in a high frequency tuned system which comprises, a visual indicator device, a test probe, an amplifier tube whose output controls said indicator device, a calibrated attenuator network connected to the input of said tube, and a capacitor connecting said network to said probe and being of sufficiently low capacitance to isolate effectively said point under test from being detuned by the shunt impedance of said network.

3. An instrument according to claim 2 in which said capacitor is connected closely adjacent to said probe and is connected through a shielded cable to said attenuator network.

4. An instrument for testing the actual voltage conditions of a point in a high frequency tuned system which comprises a visual indicator device, a test probe, an electron tube whose output controls said indicator device, means in the input circuit of said tube to vary the level of the output in a predetermined calibrated ratio, and a capacitor connected in series between said probe and said level control means, said capacitor effectively isolating said point under test from said input circuit so far as detuning of said system is concerned.

5. An instrument for testing the actual voltage condition of a point in a high frequency tuned system which comprises, a visual indicator device, a test probe, an amplifier tube whose output controls said indicator device, an input circuit for said device tube including a plurality of selectively connectable shunt impedances, a capacitor connecting said probe to said input circuit, said capacitor forming with said shunt impedances a calibrated attenuator network and also serving to minimize the detuning effect of said input circuit on the point under test so far as detuning said tuned system is concerned.

6. An instrument for testing the actual voltage condition of a point in a high frequency tuned system which comprises, an indicator device, a test probe, an electron tube whose output controls said device, a plurality of capacitors selectively connectable in shunt across the input electrodes of said tube, and another capacitor connecting said probe in series with said input circuit, said other capacitor forming with the first-mentioned capacitors a calibrated attenuator network whereby the voltage conditions at said point may be determined for any position of said selective means and with negligible detuning of said system.

7. An instrument according to claim 6 in which said electron tube is provided with calibrated means to continuously vary the mutual conductance of the tube.

8. An instrument for testing any point in a tuned high frequency circuit which comprises, an indicator device, an electron tube whose output controls said device, a calibrated level control for the input circuit of said device, a test probe, and a high impedance device connected in series between said probe and the input circuit of said tube, whereby the voltage conditions at any point in said tuned circuit can be determined with negligible detuning thereof.

9. An instrument for testing the actual voltage conditions at a point in a radio system which includes an indicator, a test probe, and isolating means connecting said test probe to said indicator including a series capacitor of the order of 2 micro-microfarads, and a calibrated attenuator network connected between said capacitor and said indicator.

10. An instrument for testing the operation of a wave signalling device such as a radio receiver while a signal is passing therethrough and with negligible effect on the signal, said instrument including an electron tube amplifier having a variable attenuator, manually adjustable means to vary the level of the output of the amplifier, and means to connect said amplifier to any point of the device where a high frequency potential normally exists, the last-mentioned means including an isolating condenser which forms with said attenuator a calibrated network for determining the character of the high frequency voltage at said point and with negligible effect on the actual potential at said point.

11. An instrument according to claim 10 in which the means for varying said attenuator and the means for varying said level are proportioned and related to act as direct reading multipliers of each other.

12. An instrument according to claim 10 in which the attenuator is adjustable in steps and the level control is adjustable progressively, the attenuator control and the level control being proportioned and calibrated so that the level control acts as a direct reading multiplier for the attenuator.

13. An instrument for testing the operation of a wave signalling device such as a radio receiver while a signal is passing therethrough and with negligible effect on the signal, said instrument comprising, an electron tube amplifier having an attenuator network connected across the input electrodes thereof, means to vary said attenuator, means to bias the control grid of the tube, means to vary said bias to vary correspondingly the output level of the tube, said bias control and said attenuator control being proportioned so that by their respective settings they act as direct reading multipliers of each other, and means to connect said amplifier to a point in said device, the last-mentioned means including an isolating capacitor whereby the calibrated setting of said attenuator control is rendered independent of the capacity of the equipment to which it is connected, and the functioning of said device is rendered independent of the input capacitance of said attenuator.

14. An instrument for testing the operation of a wave signalling device such as a radio receiver while a signal is passing therethrough and with negligible effect on the signal, said instrument comprising an electron tube amplifier having an attenuator network connected to the input electrodes, an adjustable level control for said amplifier, and means to connect said amplifier to a point in said device to be tested, the last-mentioned means including a series isolating condenser of the order of 1 or 2 micro-microfarads.

15. An instrument according to claim 14 in which said isolating condenser has a capacitance not materially greater than 8 micro-microfarads.

16. An instrument for testing the operation of a wave signalling device such as a radio receiver while a signal is passing therethrough and with negligible effect on the signal, said instrument comprising an electron tube amplifier, means to adjust the output level of said amplifier, means to connect said amplifier to a point in said device to be tested, the last-mentioned means including an isolating condenser, and a luminescent target tube controlled by said amplifier.

17. An instrument for testing the operation of a wave signalling device such as a radio receiver while a signal is passing therethrough and with negligible effect on the signal, said instrument comprising an electron tube amplifier, an input circuit for the amplifier including a variable attenuator which is adjustable to attenuate the input signal in calibrated steps substantially uniformly independently of the frequency to which the said output circuit is tuned, and means to connect said input circuit to a point in said device to be tested, the last-mentioned means including a shielded cable terminating in a test probe, and an isolating capacity of the order of 1 or two micro-microfarads connected between the probe and cable.

18. An instrument for testing the voltage conditions at any point in a tuned high frequency circuit without affecting the tuning thereof, said instrument including at least one electron amplifier tube with a screen grid for preventing capacity interaction between the input and output circuits, an input circuit for said amplifier including a calibrated manually adjustable attenuator consisting of a plurality of attenuator elements connected in shunt to the input electrodes of the tube and a series isolating capacity, whereby said shunt attenuators may be varied without affecting the actual voltage conditions at the point of test.

JOHN F. RIDER.
JACK AVINS.